June 2, 1970  TAKEHIRO OKI ET AL  3,515,036

EASY-TO-TRANSPLANT SEEDBED HOLDER AND ITS MANUFACTURING METHOD

Filed Dec. 27, 1967  6 Sheets-Sheet 2

INVENTORS
TAKEHIRO OKI,
AKIRA OTA,
TERUYOSHI MASUDA
BY Schroeder, Siegfried & Ryan
ATTORNEYS

INVENTORS
TAKEHIRO OKI,
AKIRA OTA,
TERUYOSHI MASUDA
BY Schroeder, Siegfried & Ryan
ATTORNEYS June 2, 1970  TAKEHIRO OKI ET AL  3,515,036
EASY-TO-TRANSPLANT SEEDBED HOLDER AND ITS MANUFACTURING METHOD
Filed Dec. 27, 1967  6 Sheets-Sheet 6

INVENTORS
TAKEHIRO OKI,
AKIRA OTA,
TERUYOSHI MASUDA
BY Schroeder, Siegfried
& Ryan
ATTORNEYS

United States Patent Office 3,515,036
Patented June 2, 1970

3,515,036
**EASY-TO-TRANSPLANT SEEDBED HOLDER
AND ITS MANUFACTURING METHOD**
Takehiro Oki, Sapporo, Akira Ota, Kawakamigun, and Teruyoshi Masuda, Obihiro, Hokkaido, Japan, assignors to Nippon Tensai Seito Kabushiki Kaisha, Tokyo, Japan, a corporation of Japan
Filed Dec. 27, 1967, Ser. No. 693,858
Int. Cl. B31d
U.S. Cl. 93—1  6 Claims

ABSTRACT OF THE DISCLOSURE

The disclosure is directed to a seedbed holder for transplanting seedlings where the seedbed holder is formed in a serpentine shape formed from a plurality of hollow, bottomless compartments made of paper or paper-like thin membranes. The compartments are secured together in some forms of the invention by a water-soluble cement and in other instances by a water-insoluble cement, certain of the members or membranes being decomposable and others being nondecomposable in carrying out a structure which generally is of a serpentine nature forming a plurality of compartments. Through the use of the serpentine form, the seedlings cultivated in the seedbed holder may be withdrawn from the mass in a continuous series by unwinding or unfolding the serpentine forms.

---

The present invention relates to a transplanting seedbed holder, and more particularly to a seedbed holder which is convenient and easily usable for transplanting small plants by a transplanting machine and to the method of manufacturing the seedbed holder.

The seedbed holders are formed from nondecomposable paper which is layed out from a roll and certain decomposable or non-decomposable transverse elements are secured to the nondecomposable paper, after which another layer of the nondecomposable paper is secured to the transverse elements. Wherever it is desired that the form retain its shape, water and soluble cement or paste is used, and where it is desirable to allow intermingling of the roots of the seedlings, a decomposable paper is used. Such an array is cut transverse to the longitudinal direction of the assembly and the different sections are secured to each other by a water-soluble cement or paste to form the serpentine arrangement which is easily disassembled upon its use for transplanting.

It is generally well known that when a seedling or young plant is transplanted, preserving the soil around its roots as much as possible greatly increases the subsequent growth of the plant. For this purpose, various forms of transplanting structures have been used, with or without bottoms for holding the seedbed, such as the earthenware pot, wooden-strip pot, plastic pot, peat pot, paper pot, or paper tube. Among these, the paper tube has proven to be highly efficient and easy to handle in the transplanting of many plants with a minimum of manpower. For instance, the seedlings of beets, tobacco, watermelon, melon, lettuce, tomato, beans, sweet corn, cabbage, cauliflower, celery, parsley, and saplings have been transplanted with excellent results and such is found reported in a Japanese publication entitled "Vegetable Cultivation and Paper Pots," dated 1964, by Shigeki Matsubara, of the Tokyo College of Agriculture.

Different types of transplanting machines have also been developed for transplanting the paper tubes, such as just described, and a description of such machines may be found in Japanese patent publication Sho 39–13003, July 8, 1964. However, each of the machines has one particular aspect in common, and that is that the paper tubes must be handled individually by the machines. The present practice is to form a number of paper cylinders or tubes into a mass by gluing or cementing all of the tubes together with a water-insoluble cement and are only separated prior to use by the transplanting machine. Since the manpower required for separating the cylinders exceeds the time necessary for the work with the transplanting machine, the efficiency of the work using the paper cylinders as set out above is extremely low.

The present invention is directed to a method of manufacturing a paper holder free from the above disadvantages while contributing to higher efficiency of mechanized transplanting. The present inventors have solved the problem by manufacturing a paper holder suited to the nature of the plant to be transplanted, the holder being able to form itself into a single continuous row of seedlings which are successively delivered to a transplanting machine with an appropriate dividing device.

A seedbed holder made in accordance with the teaching of the present invention is made of paper or paper-like thin membranes that in the time of transplanting, the seedbed holders may be drawn out into a continuous strip like a belt by pulling on one end of it. The means and method of connecting the bed is designed to satisfy the physiological nature of each plant. That is, a plant whose roots are extremely sensitive to damage in transplanting is held in the paper tubes without interconnection through the roots, and for a plant which is to be transplanted which has a root cutting effect or is less sensitive to root damage, the holder is so designed as to permit the roots to entangle themselves into a long strip. Thus the present invention relates to a seedbed holder which permits the entanglement of roots into a long strip which facilitates the transplanting and the method of manufacturing the holder.

It is therefore a general object of this invention to provide a seedbed holder which can cultivate the seedlings in such a manner that the group of seedlings can be continuously drawn out and separated one by one without damaging their roots yet permitting easy transplanting.

Another object of the present invention is to provide a simple and reasonable method of manufacturing the seedbed holder.

Still another object of this invention is to provide a method of manufacturing a seedbed holder using two strips of paper or paperlike material, the holder being folded before use, expanded into honeycomb structures for use, drawn from one end of the honeycomb structure after cultivation into units of paper tubes which emerge in a single band or line.

It is another object of this invention to provide a seedbed holder and its method of manufacture where the seedbed holder is a sequence of paper tubes protecting the roots through connecting linking bands, the tubes being secured together by cement in a serpentine form and being easily separated into rows of tubes when subjected to a water treatment so that they may be divided into units by a transplanting machine.

It is still another object of the present invention to provide a seedbed holder and its method of manufacture where the holder is designed so that the adjacent seedlings may have their roots entangled with each other within long serpentine rows, without root entanglement between the rows.

These and other objects and advantages of the invention will more fully appear from the following description, made in connection with the accompanying drawings, wherein like reference characters refer to the same or similar parts throughout the several views, and in which:

Figure 7:
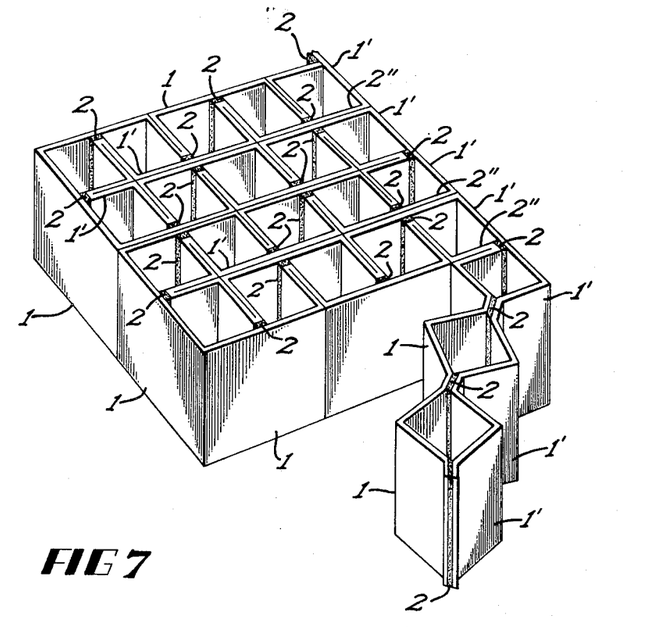
FIG. 7 is an isometric view illustrating the separation of the paper compartments for transplanting of the structure found in FIG. 6.
Figures 8, 9:
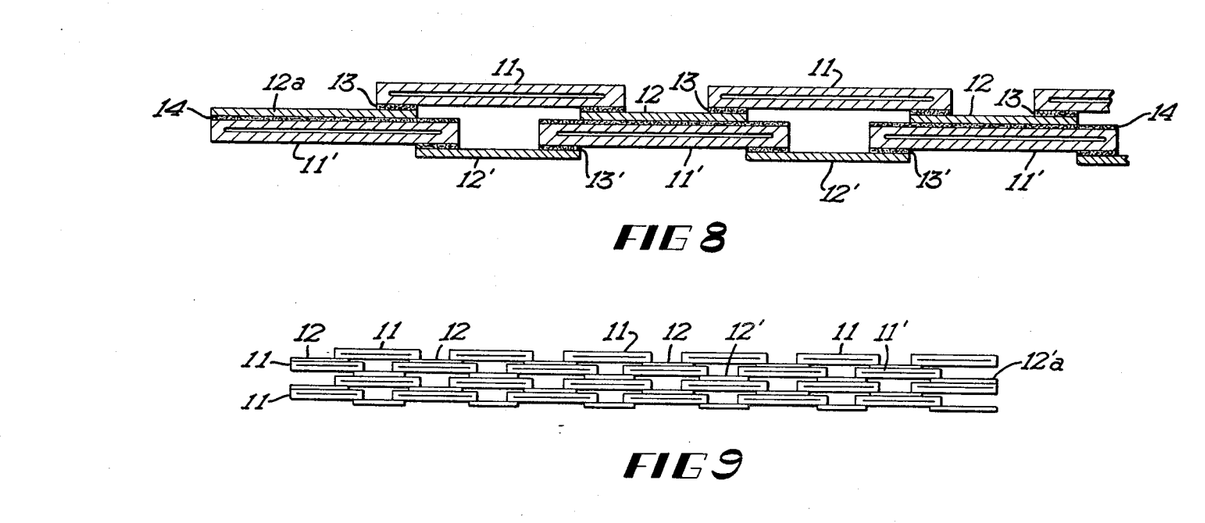
FIG. 8 shows a cross section of another embodiment of the invention wherein paper compartments are connected by linking bands and then laminated.
FIG. 9 is an elevation of several of the sections such as used in FIG. 8.
Figure 10:
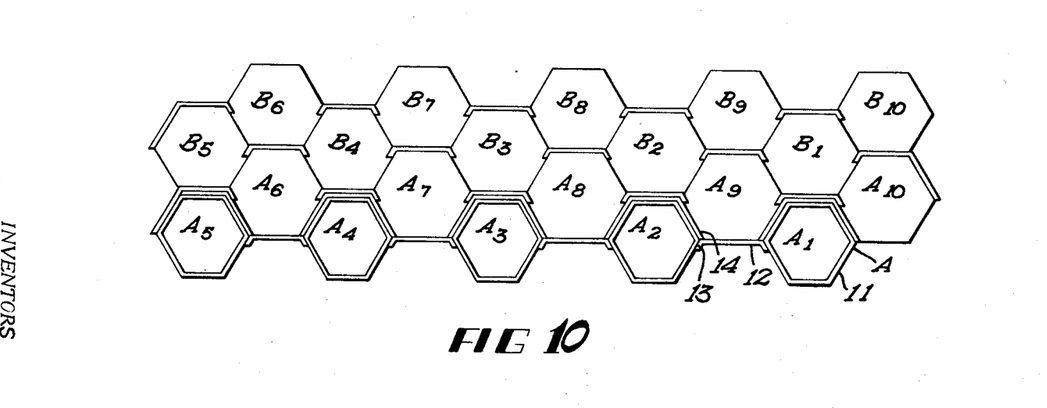
FIG. 10 shows an expanded plan view of the seedbed holder illustrated in FIGS. 8 and 9.

It should be recognized that the illustrations found in the drawings are exaggerated to convey the proper construction of the paper material units which are secured together by suitable paste or cement. FIGS. 1 through 7 show one embodiment and FIGS. 8 through 10 show another embodiment of the invention, both embodiments relating to a seedbed holder and the method of manufacturing thereof which are used with plants that are extremely sensitive to root damage in transplanting.

Figure 1:
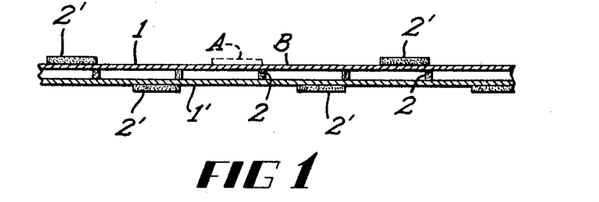
FIG. 1 shows a longitudinal section of two strips of membranes cemented together forming a first composite structure.
Figure 2:
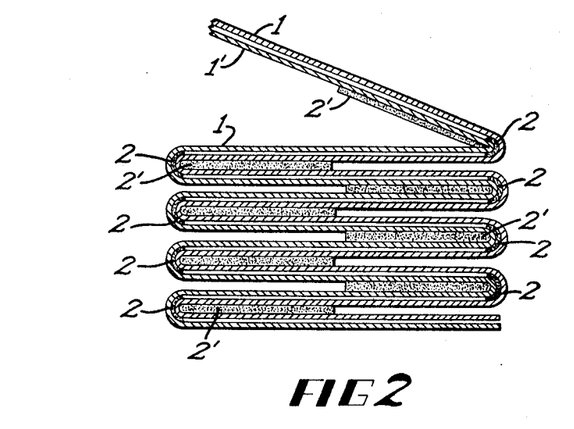
FIG. 2 shows a folded and laminated section of the assembly as found in FIG. 1.

In the first embodiment, a nondecomposable paper or paperlike material 1 and 1' are unwound from a roll (not shown) and may be coated with an appropriate water-soluble or water-insoluble cement or paste 2 at appropriate transverse intervals to the longitudinal direction of the paper 1. That is, narrow bands of cement 2 are applied to the strip of paper 1. A water-soluble paste 2', which in some cases may have small amounts of water-insoluble paste or cement added thereto, is alternately applied on the top and bottom of strips 1 and 1' for a width of one half that applied between cement bands 2. At specified intervals, which will be disclosed in more detail later, cement 2' is omitted at part A on the top of sheet 1 or bottom of sheet 1' at a dimension equal to the width of the plurality of paper compartments to be formed in the overall mass. A folding line is then made alternately at the position of cement application 2, and as shown in FIG. 2, a serpentine lamination is formed by overlapping or folding the assembly and in such a position, the laminations are dried, thus effecting the first step of manufacturing the structure.

Figure 3:
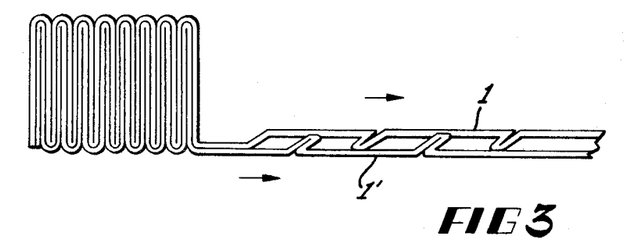
FIG. 3 is an elevational view illustrating the process of expanding the laminated membranes as shown in FIG. 2.
Figure 4:
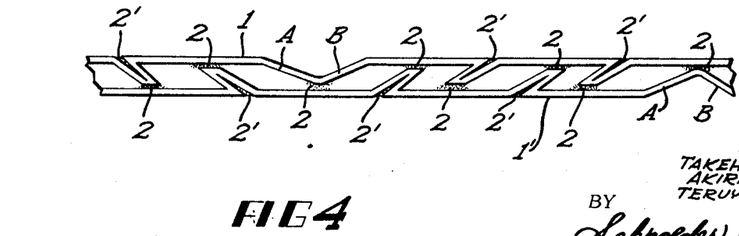
FIG. 4 is an enlarged view of the expanded row of paper compartments.

In continuing the process of manufacture, one end of the lamination produced in the step just described, is pulled from the mass and flattened and as the result of the interaction of the bonding between the parts which are secured by the water-insoluble cement 2 and the water-soluble cement 2' and the one part A which is not cemented, units of the paper compartments having an overall transverse width corresponding to the final width of the paper compartments may be drawn out in one direction and flattened. It will also be observed that by continuing the same pulling or drawing process, the next units which will be drawn from the mass will be flattened with the paper strips combining and flattening in a direction opposite that to which is being used to pull the units from the mass.

Figure 5:
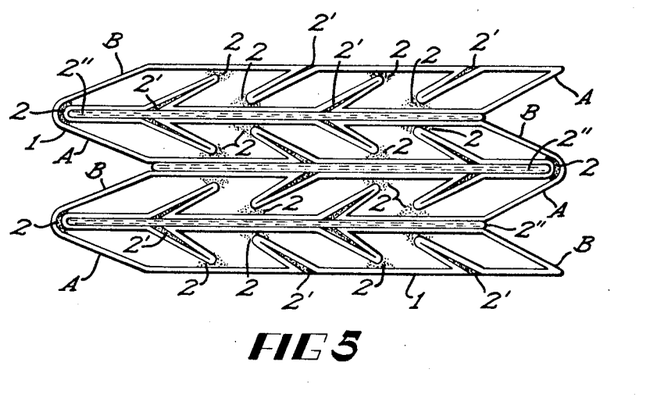
FIG. 5 shows the next step in the process of folding the paper compartment rows to appropriate length and securing them together with cement.

In other words, a number of paper compartments will be drawn out which correspond to the width of the overall mass and the upper strip 1 will alternately fold in the direction of pulling the units from the mass and in a direction opposite to that of the direction used to pull the units from the mass, the entire tape assembly being flattened. Subsequently, as shown in FIG. 5, the top or bottom of this flattened mass is approximately applied with a water-soluble paste of the same type as paste or cement 2'. The parts adjacent the fold, namely part A and a similar part B, do not have any cement applied thereto. All of the units are alternately folded in a manner illustrated in FIG. 5 which produces a lamination of a specified number of seed-holder units, the assembly being dried under pressure.

Figure 6:
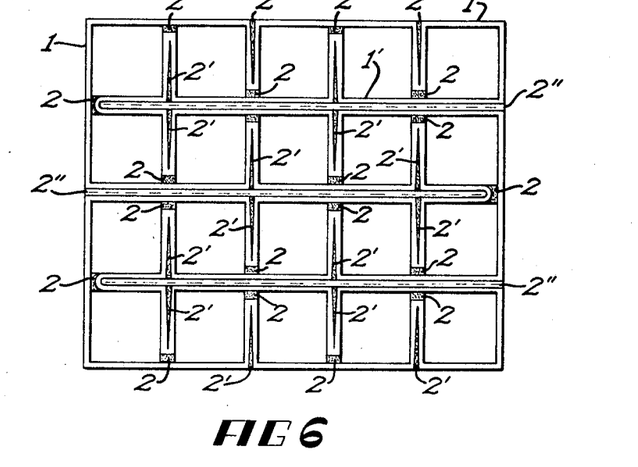
FIG. 6 shows an expanded plan view of a plurality of the assemblies formed in FIG. 5.

Upon expanding the structure just described, a seedbed holder as shown in FIG. 6 will be produced in which a plurality of paper tubes or compartments are formed. These compartments are filled with soil, sown with the appropriate seeds, and watered, and after cultivation of the seedlings, the end which is exposed is pulled away from the remaining structure. Separation will take place as shown in FIG. 7 because the water-soluble cement or paste 2 or 2' will release each of the compartments and through the application of insoluble cement 2, the compartments will remain intact in a long chain-like arrangement.

Where a transplanting machine with an appropriate cutter or press is employed, the strips are easily separated from the soil block to provide the individual seedlings. In the case where the cement 2 may be of a water-soluble type, a transplanting machine having an opening device pulling the strips 1 and 1' in opposite directions will release the soil compartments upon the cement being dissolved in water. Thus in either case, the separated seedling, together with its soil block, will be transplanted successfully in the field and a large number of seedlings can be automatically transplanted at a great reduction in labor cost.

In the second embodiment shown in FIG. 8, a plurality of flattened tubes 11 and 11' are made from a tape or strip of non-decomposable paper. The flattened tubes are arranged in two layers spaced apart by approximately one third of their width, the layers being staggered by one half the pitch between the flattened tubes. The ends of flattened tubes 11 and 11' are connected to each other through nondecomposable linking bands 12 and 12' through the use of a water-insoluble cement or paste 13. Bands 12 and 12' extend beyond the ends of flattened tubes 12 and 12' and are used in cooperation with an adjacent flattened tube 11 and 11' by covering the top or bottom thereof. Once an arrangement is formed, such as just described, the complete assembly is formed into a roll of material. Another pair of linking bands 12a and 12a' which are used at both ends of the assembly are wider in cross section than linking bands 12 or 12' and the end members ordinarily requiring a linking band 12 or 12' have bands 12a substituted therefor.

Once the structure just described is formed into a laminated roll of flattened bands and compartments, the assemblies are cut transverse to the direction of drawing the same from the roll to form a plurality of such units. The water-insoluble paste 13 is applied to the part of each unit corresponding to one end of the top linking band 12a and a water-soluble paste 14 is applied to the entire surface of the other parts. The resulting units are accurately stacked on top of each other in the desired quantities, the combined structure being compressed and joined.

Upon expanding the seedbed holder as shown in FIG. 10, each compartment is filled with soil, sown with the appropriate seed, watered, and when seedlings emerge, one end, such as "A" is pulled, producing a series of paper compartment rows which are drawn out continuously. When these rows are delivered to a transplanting machine with a cutter for the linking bands 12 and 12', the paper compartments can be separated one by one and can be continuously transplanted in the field.

The third and fourth embodiments of the invention are shown primarily in FIGS. 11 through 13 and 14 through 17 illustrating seedbed holders and the process for manufacturing thereof. The seedbed holders are adapted for plants which may have their roots cut or which are less sensitive to root damage in transplanting. In constructing the third embodiment, a nondecomposable paper or paper-like material 21 is unwound from a roll of such paper and horizontally arranged. A water-insoluble cement or paste 24 is then applied at appropriate intervals and for an appropriate width to the upper surface of strip 21. An auxiliary strip of paper or tape 22 cut to a somewhat narrow width and formed from a decomposable paper is superimposed and secured to paper strip 21 at one edge thereof and slightly disposed from the other edge thereof. Also, another tape of narrower width 21' formed from a nondecomposable paper or the same material as strip 21 is secured to strip 21 at a substantially center portion thereof. A water-insoluble paste 24' is then applied to the upper and opposite edge of the paper tape or strips just described, that is tapes 22 and 21'. Another sheet of nondecomposable paper 21'' having the same characteristics and width as strip 21 is superimposed upon tapes 22 and 21', the edge being staggered or offset by the same amount as the offset distance between the edge of strip 21 and the adjacent edge of tape 22. The strip is then rolled together and the resulting roll is cut transversely to the longitudinal axis at a predetermined dimension.

Figure 12:
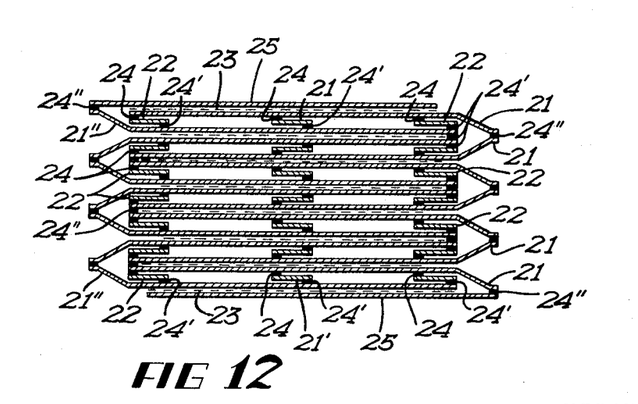
FIG. 12 shows a longitudinal section of a number of laminated strips such as found in FIG. 11 forming a seedbed holder.

Next, both ends of the top side designated I and I' and the bottom side II and II' of each unit resulting from cutting the roll, are respectively coated with a water-insoluble cement or paste 24'' along the edges thereof. The top and bottom surfaces of such a unit are then respectively coated with a water-soluble cement or paste 23. Alternate sections are then reversed so that strips 21 are adjacent to each other and strips 21'' are adjacent to each other. In other words, the units are then reversed and cemented together in such fashion that the top surface of one unit always meets the top surface of another unit and the bottom surface of one unit always meets the bottom surface of another unit. The areas with cement 24'' are also joined to each other. The assembly is then finished with a cover member 25 formed from the same material as strip 21 which is secured across each of the unfinished sides and is best illustrated in FIG. 12.

Figure 13:
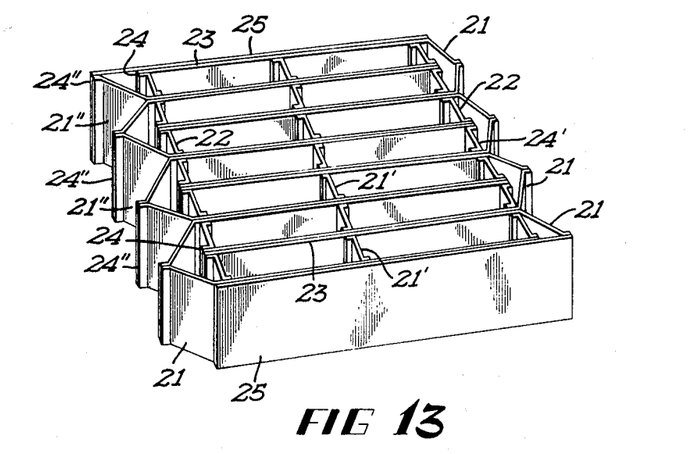
FIG. 13 shows an expanded isometric view of the structure shown in FIG. 12.
Figure 14:
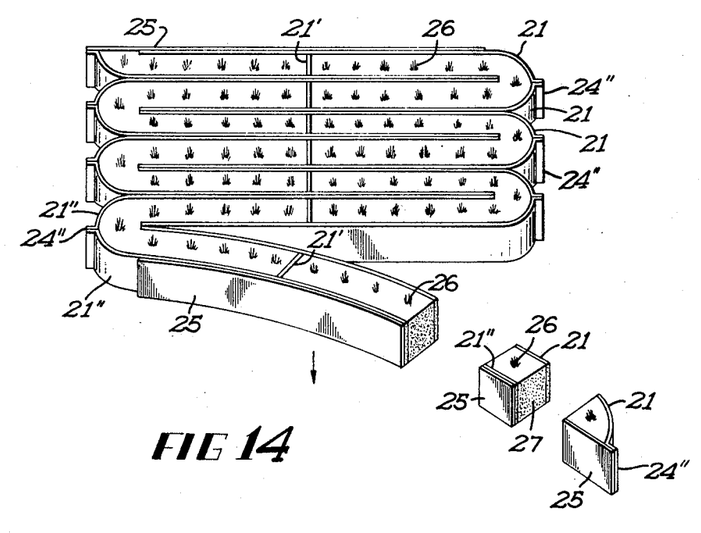
FIG. 14 illustrates the structure during the time of transplanting the seedlings and shows the condition of the seedbed holder shown in FIG. 13.

After the structure is completed, and expanded, it will appear as shown in FIG. 13 which is filled with soil, the seeds sown therein, and the structure watered. Pulling on the end terminating with its edge secured to cover strip 25 causes a strip of soil and seedlings 26 to be drawn out in succession in the channel arrangements formed by strips 21, 21'', and 21', which helps regulate the width of the trough-like arrangement. When delivered to a transplanting machine equipped with an appropriate cutter, the seedlings and the soil can be cut into a plurality of cubes 27 and continuously transplanted in the field.

Figure 15:
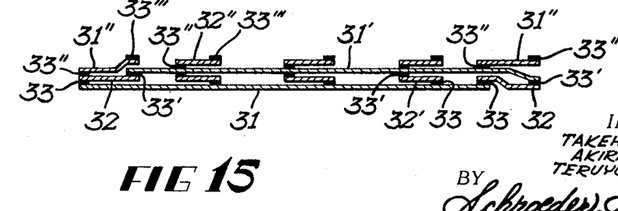
FIG. 15 shows a longitudinal section of another embodiment of the invention.

Turning now to another embodiment, which is disclosed primarily in FIG. 15, a paper-thin strip 31 is unwound from a roller of material which resists decomposing for a period of time to at least include the cultivation period. A water-soluble cement or common paste 33 is applied thereon at appropriate intervals and of a predetermined width which is usually a narrow band. A plurality of such narrow bands are applied to strip 31. Tapes or a relatively narrow paper material which is readily decomposable 32 and 32' are applied respectively to the ends of strip 31 and the intermediate portions thereof where cement 33 is applied. As shown in FIG. 15, strip 32 extends beyond the end of strip 31. A small band of water-soluble paste or cement 33' is applied to the upper edge of tapes 32 and 32' opposite the edge where cement 33 is applied on the lower side. Another strip 31' which is formed of the same material as strip 31 is secured to tape members 32 and 32' at the portions having cement 33' applied thereto. In other words, strip 31' is flush with the right edge of tape 32 and terminates upon joining the edge of tape 32 on the left side. A cement or paste 33'' which is of the same composition as water-soluble paste 33 is applied on the top surface of strip 31' at appropriate intervals in the form of narrow bands. Another pair of tapes 31'' having the same nondecomposable properties as strip 31 are secured above the right edge of strip 31' and above the left edge of tape 32. In a similar manner, a tape 32'' having the same composition as tape 32' is secured to strip 31' with their bottom left edges matching the narrow bands of cement 33'. The entire structure is then formed into a roll of material.

Upon unrolling the material from the roll, which would appear in the form shown in FIG. 15, the top right edges of the tape strips 31'' and 32'' are coated with a water-soluble cement or paste 33''' in the form of a narrow band, and the entire structure is then cut perpendicular to the direction of unwinding to form a plurality of such units. Such units are stacked in succession on top of each other by appropriately matching the narrow bands of cement. At the extreme end of the complete assembly, a cover 35 (FIG. 16) having approximately the same nondecomposing properties and width as strip 31' is secured to the assembly with water soluble cement, cover member 35 having its right edge flush with the right edge of the complete assembly.

Figure 16:
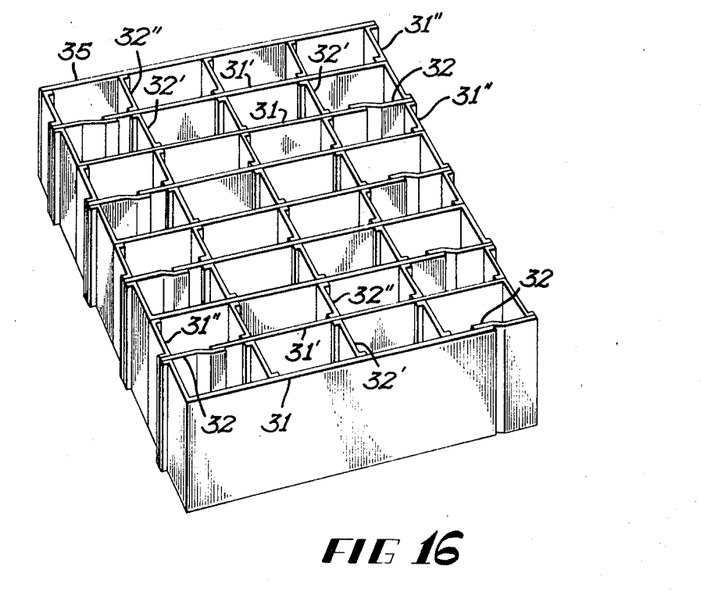
FIG. 16 shows an expanded isometric view of the seedbed holder which shows the seedbed holder as illustrated in FIG. 15.
Figure 17:
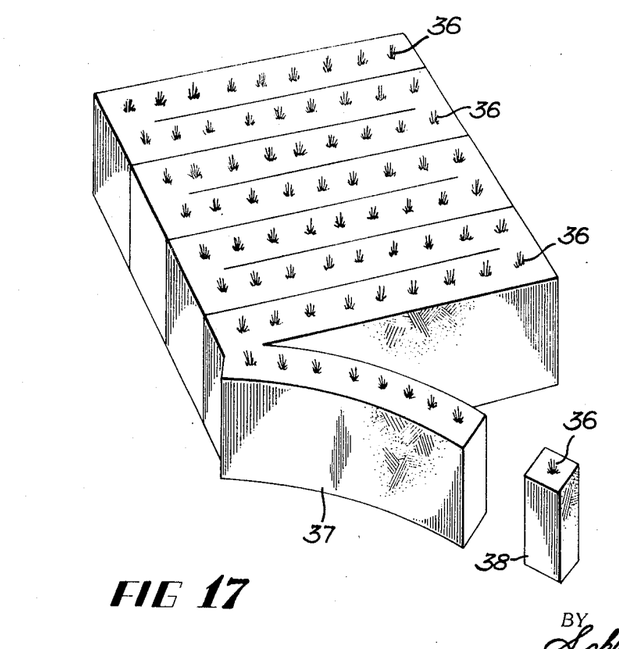
FIG. 17 shows the cultivated state of rows of seedlings grown in the seedbed holder of the structure shown in FIG. 16.

Upon completing the assembly, the structure is expanded as seen in FIG. 16, filled with soil, sown with the appropriate seeds, and watered. Then the appropriate end of the structure is pulled at one end as seen in FIG. 17, seedlings in a roll will emerge with roots entangled continuously due to the decomposition of members such as 32' and 32''. During the period of cultivation, strips 31, 31', and 31'' serve as partitions preventing entanglement between the rows. Thus when delivered to a transplanting machine with an appropriate cutter, the seedlings can be continuously transplanted in the field. It will be observed that as the strips are cut, a plurality of blocks 38 may be created for use by the transplanting machine.

The paper strips or paperlike material which is employed in this invention are made of materials with different decomposition properties depending upon the species of plant to be transplanted and the characteristics of the holder. For instance, in the first, second, and third embodiments, the requirement for the strips to be strong and last through the time of transplanting requires that the paper be strong and anti-rot resistant. Therefore, it has been found that paper made of pulp impregnated with a 3% solution of 8-oxiquinoline copper or paper mixed with a vinylon fiber has proved highly sufficient. Vinylon is a common name adopted in Japan for a polyvinyl alcohol synthetic fiber. In the fourth embodiment, the paper strips or strip-like material should preferably be of material such as a kraft paper of 80 g./m.² blended and absorbed with about a 3% solution of cation surface-active agent, which can be quickly decomposed by an ion surface-active agent poured over the paper material several days before the termination of cultivation. The auxiliary strips or tapes used in the third embodiment and the highly decomposable tapes used in the fourth embodiment should be of such a composition as to decompose during the period of cultivation and may be formed from kraft paper of 50 g./m.² absorbed with about 100 parts per million of ammonia or impregnated with an adequate amount of a cellulose-decomposing enzyme or may be formed from any other water-soluble paper.

The seedbed holder in the first embodiment of the invention is best suited for leaf vegetables, the second embodiment is best suited for root vegetables, and the third and fourth embodiments are best suited for wheats and rices. However it will be found that the seedbed holder described in the first embodiment may be applied with satisfactory results for transplanting root vegetables, wheats, and rices, as well as small trees and leaf vegetables.

To illustrate the embodiments described herein in more detail, and in particular with their method of being formed, the following examples are set forth making use of the present invention:

EXAMPLE 1

Two rolls of 90 cm.-wide kraft paper blended with a 10% solution of vinylon and a 1% solution of 8-oxiquinoline copper are unwound. One paper is coated with paste 2 which is formed from a 20% aqueous solution of polyvinyl alcohol at 3 cm. intervals having a width of 2 mm. The other paper was overlayed therein, and the water-soluble cement or paste was applied alternately on the top or bottom side of the assembly at the position of cement 2 for a width of one half the spacing between the bands of paste or cement 2. The band of cement 2' is alternately omitted on the top and bottom surface at every 19th position of cement band 2. At the positions of cement 2, the top and bottom surfaces are alternately folded to make the entire structure serpentine in nature with 950 folds, which are then placed in a holder and compressed with approximately 5 kg. pressing the laminations together for a 24-hour period at room temperature.

The laminated structure just described is then pulled through a pair of rollers by starting the strip from one end of the serpentine structure. The top and bottom surfaces of strips 1 and 1' are then coated with a water-soluble cement or paste 2' and immediately thereafter, the middle portion adjacent the position of insoluble cement 2 is folded to make 50 serpentine laminated folds. The whole assembly is then compressed with about 10 kg., and left for 24 hours to be dried at room temperature. The paper width of 90 cm. is then divided into 10 equal units, thus providing 10 groups of paper compartments totaling 950 compartments. That is, the assemblies are 19 compartments wide and 50 compartments long, with one side of each compartment measuring approximately 1.5 cm.

The paper compartments are then expanded, filled with fertile soil, and sown with lowland rice, lettuce, and cabbage, and cultivated respectively for 20, 30, and 30 days at which time the seedbed structure is delivered to a transplanting machine with an opening device. The seedlings are automatically drawn from the serpentine structure.

EXAMPLE 2

In carrying out the embodiment shown in FIGS. 8 through 10, a plurality of flat-pressed paper cylinders or tubes with a bore of 30 mm. may be formed of paper made of pulp added with a 3% solution of vinylon. The flat-pressed paper cylinders are then arranged in two layers spaced approximately 15 mm. apart. A 25 mm. wide paper coated with a vinyl acetate type bonding agent and reinforced with threads is moved under the gap created by the flat-pressed paper tubes. However the threaded paper attached to the end of the lower layer was not covered with cement or paste. The lower flat-pressed tubes or compartments are coated with a starch paste or cement to a width of 2 cm. at 2 cm. intervals using a starching machine and were wound around the roll with the upper and lower flattened tubes cemented together. The wound rolls were then cut to 80 mm. length, the 5 mm. portion corresponding to one end of the nonpasted or cemented lower threaded paper was coated with a vinyl acetate type bonding agent and all except this paper had the top surface coated with starch paste. Thus after superposition and compression, an aggregate of 280 paper tubes as shown in FIG. 10 is obtained. These cylinders or compartments are expanded, sown with lettuce, cultivated for 30 days under a hotbed condition of 15 degrees C. to 20 degrees C., and delivered after 30 days to a transplanting machine with a cutter.

EXAMPLE 3

Figure 11:
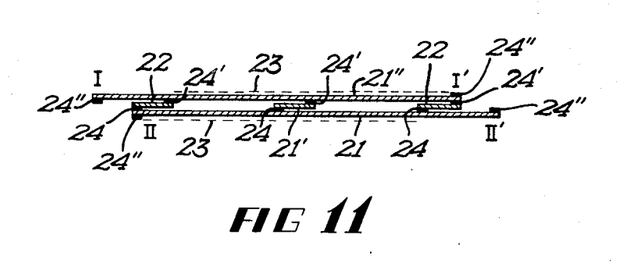
FIG. 11 shows a longitudinal section of another embodiment wherein strips of paper are cemented in parallel forming a plurality of compartments.

Kraft paper 21, 32 cm. wide, of 60 g./m.$^2$, is blended with a 10% solution of vinylon and a 0.8% solution of 8-oxiquinoline copper and is unwound from a roll, layed out flat and coated at specified intervals such as shown in FIG. 11, with a vinyl acetate emulsion 24 which is used as a water-insoluble cement or paste. A paper tape 22 which is 18 mm. wide formed of kraft paper of 60 g./m.$^2$ is secured near the edge of paper 21 on one side and is offset towards the center on the other side. Another tape 18 mm. wide having the same qualities as kraft paper 21 is pasted or cemented over the center portion of strip 21. The ends of the opposite sides of tapes 22 and 21' are then coated with vinyl acetate emulsion 24'. Another strip of kraft paper 21" of the same quality as strip 21 is overlayed over tapes 22 and 21' with sheet 21" extending to the left and being offset by 25 mm., the whole structure being wound in a roll. The resulting roll is then unwound and cut to 30 cm. wide units perpendicularly to the direction in which it is wound. Both ends of the top surface and bottom surface of each unit are then coated with vinyl acetate emulsion 24' in a narrow band and the remaining portion of the upper and lower surfaces of each unit are then coated with an 18% solution of polyvinyl alcohol 23 in the form of a water-soluble paste. Thirty such units are then piled or stacked on top of each other in such a manner that the ends having the vinyl acetate emulsion contact each other as well as the surfaces coated with the 18% solution of polyvinyl alcohol. The entire structure then has a cover strip secured on the top and bottom which is formed of the same material as strip 21. The entire structure is dried and cut to 3 cm. lengths perpendicular to the direction the strip was wound, thus producing 10 seedbed holders.

Each seedbed holder is then expanded as shown in FIG. 13, filled with fertile soil, sown amply with low-land rice and upland rice, cultivated for approximately 20 days to produce seedlings with about 3.5 regular leaves. The seedlings are then successively drawn out and delivered to a transplanting machine with a device for cutting to approximately 1 cm. length.

EXAMPLE 4

Kraft paper 31, which is 31 cm. wide, of 60 g./m.$^2$ blended with a 1% solution of cation PB–40 which contains a chemical composition of trimethyl alkyl ammoniumchloride, is unwound from a roll of paper, layed out flat as shown in FIG. 15, and coated on top at appropriate intervals with a water-soluble paste 33 of 18% polyvinyl alcohol. The PB–40 is a trade name for the Nihon Yushi Kabushiki Kaisha of Yuraku-cho, Chiyoda-ku, Japan. A pair of tapes 32, which is 24 mm. wide, and 32', which is 18 mm. wide, of 60 g./m.$^2$ are unwound from different rolls and secured to the small bands of water-soluble paste 33 with tape 32 extending to the right of paper strip 31. An 18% aqueous solution of polyvinyl alcohol 33' is then applied respectively to the top right end and left end of kraft paper tapes 32 and 32'. Subsequently, another kraft paper 31' which is 31 cm. wide and of the same quality as strip 31, is blended with a 1% solution of cation PB–40 and is secured on the right edge to tape 32 and on the right edge of tape 32 on the left side of the structure. The top surface of strip 31' is then coated with an 18% aqueous solution of polyvinyl alcohol 33″ at the appropriate intervals opposite the paste or cement bands 33′ and a tape of kraft paper 31″ having the same quality as strip 31 is unwound from a different roll and secured to the edge of tape 32 on the left and to strip 31′ superimposed above tape 32. In addition, tapes 32″ of the same quality as tape 32′ is unwound from a different roll with the lower left edge of tape 32″ meeting the paste or cement band 33″ formed on strip 31′. The whole structure is then wound into a separate roll. The roll is then unwound and tapes 31″ and 32″ are coated on the top right edge with an 18% aqueous solution of polyvinyl alcohol 33‴ and then cut to 30 cm. wide units, the cut being made perpendicular to the direction of unwinding. The units are then successively overlayed and on the top-most of 15 overlayed units is pasted or secured a cover 35 formed of kraft paper 31 cm. wide, of 60 g./m.² blended with a 1% solution of cation PB–40 with its right edge flush with the right edge of the complete structure. The structure is then cut into 10 equal parts at right angles to the direction the roll is unwound thereby producing 10 different structures. Each structure is expanded as shown in FIG. 16, filled with fertile soil, sown with lowland rice, and cultivated until approximately 3.5 regular leaves appear. The seedlings are then delivered to a transplanting machine equipped with a means for drawing the paper compartments to a cutting device where the seedlings are cut therefrom to approximately 1 cm. intervals.

It will, of course, be understood that various changes may be made in the form, details, arrangement, and proportions of the parts without departing from the scope of the invention which consists of the matter shown and described herein and set forth in the appended claims.

What is claimed is:

1. The method of manufacturing a seedbed holder from a pair of nondecomposable paperlike strips by shaping the same in holding relationship with water-soluble cement comprising the steps of:
    (a) securing the pair of strips to each other at predetermined equal intervals with the water-insoluble cement to form compartments therein;
    (b) coating segments of the outer surfaces of the strips with the water-soluble cement at predetermined equal intervals;
    (c) alternately folding the pair of strips at the uncoated portions of the outer surfaces to form a laminated mass;
    (d) drawing the strips from the laminated mass to produce a substantially flat compartmented tape;
    (e) coating the outer surfaces of the compartmented tape with the water-soluble cement at predetermined intervals;
    (f) and alternately folding the compartmented tape to bind the outside surfaces thereof and form the compartmented tape in a serpentine form.

2. The method of manufacturing a bottomless seedbed holder from a pair of nondecomposable paperlike strips by securing the same in holding relationship with water-soluble and insoluble cements comprising the steps of:
    (a) coating one of the pair of nondecomposable paperlike strips in a plurality of narrow first bands at predetermined intervals with the water insoluble cement;
    (b) overlaying the other strip in confronting relationship with the water-insoluble cement;
    (c) alternately coating the ouside of the strips in a plurality of transverse second bands with the water-soluble cement extending from said narrow bands towards one end of the strips and of a width approximately one half the dimension of said predetermined intervals and alternately omitting the water-soluble cement from the outside of the strips upon the number of second bands reaching a predetermined quantity;
    (d) alternately folding the strips about said plurality of narrow first bands to bind the outside of the strips to each other in the area of said plurality of second bands of cement;
    (e) drying the folded strips in a first serpentine form;
    (f) pulling the folded strips into an elongated form and coating the uncoated areas with water-soluble cement adjacent the omitted bands of cement formed before folding;
    (g) and alternately folding the elongated form about said plurality of narrow first bands lying adjacent the omitted bands of cement and drying the cement therein to construct a second serpentine form.

3. The method set forth in claim 2 including the step of:
    (h) compressing the folded strips upon having a serpentine form.

4. The method of manufacturing a seedbed holder from a plurality of paper compartments in strip arrangement of predetermined length and a plurality of paper linking members joined together by water-soluble and water-insoluble cement comprising the steps of:
    (a) flattening the paper compartments in strip arrangement to form a tape;
    (b) forming the tapes into parallel arrangements and joining the plurality of paper-linking members to the flattened compartments of the tapes by a coating of water-insoluble cement applied thereto;
    (c) coating the outer surfaces of the parallel arrangements with the water-soluble cement;
    (d) overlaying the parallel arrangements and pressing the same into cementing relationship;
    (e) and alternately joining at opposoite ends, the tape in confronting and cementing relationship with the soluble cement to form a serpentine-shaped seedbed holder.

5. The method of manufacturing a seedbed holder as set forth in claim 4 including the step of:
    (f) staggering opposing paper compartments of the tape when formed into parallel arrangements by one half the pitch of the compartments.

6. The method of manufacturing a serpentine-shaped seedbed holder from a pair of equal width nondecomposable paperlike strips cooperating with a plurality of decomposable linking members and at least one nondecomposable linking member secured in place with water-soluble and water-insoluble cement comprising the steps of:
    (a) coating one side of one nondecomposable paperlike strip lengthwise with the water-insoluble cement in narrow bands at predetermined intervals including one edge of the strip;
    (b) overlaying all the narrow bands of water-insoluble cement except one band located substantially in the center with the edge portion of the plurality of the decomposable linking members;
    (c) overlaying the narrow band of water-insoluble cement located substantially in the center of the strip with the edge portion of the nondecomposable linking member;
    (d) coating the linking members with the water-insoluble cement in a narrow band at the opposite edge and side thereof from the edge and side secured to the nondecomposable paperlike strip;
    (e) overlaying the plurality of decomposable and nondecomposable linking members with the other nondecomposable paperlike strip so that the strips are transversely offset from each other;
    (f) cutting the assembled strips and linking members transversely into a plurality of parts of predetermined width;
    (g) coating the nondecomposable paperlike strips with the water-insoluble cement in narrow bands at the opposite side thereof from the side secured to the linking members and at the transversely opposing edge and same side thereof as the side secured to the linking members;

(h) coating the nondecomposable paperlike strips on the outer surfaces thereof between adjacently secured linking members with water-soluble cement;

(i) and overlaying the assembled strips and linking members in water-soluble and water-insoluble confrontation forming a serpentine-shaped seedbed.

References Cited

UNITED STATES PATENTS 2,593,092    4/1952    Bergstein _____________ 93—1
3,164,507    1/1965    Masuda _____________ 47—37 X BERNARD STICKNEY, Primary Examiner U.S. Cl. X.R.

47—37; 156—204, 227, 291; 229—15